United States Patent [19]

Friedemann et al.

[11] 4,264,564

[45] Apr. 28, 1981

[54] PROCESS FOR THE MANUFACTURE OF HIGH PURITY SILICIC ACID

[75] Inventors: Wolfgang Friedemann, Neuss; Helmut V. Freyhold, Düsseldorf-Oberkassel; Alfred Koster, Langenfeld; Wolfgang Pesch, Grevenbroich, all of Fed. Rep. of Germany

[73] Assignee: Henkel Kommanditgesellschaft auf Aktien, Düsseldorf-Holthausen, Fed. Rep. of Germany

[21] Appl. No.: 71,122

[22] Filed: Aug. 30, 1979

[30] Foreign Application Priority Data

Sep. 16, 1978 [DE] Fed. Rep. of Germany ....... 2840459

[51] Int. Cl.³ .............................................. C01B 33/12
[52] U.S. Cl. ................................... 423/339; 423/338; 423/340
[58] Field of Search ............... 423/325, 335, 338, 339, 423/340

[56] References Cited

U.S. PATENT DOCUMENTS 3,433,593  3/1969  Remhardt et al. .................... 423/339

FOREIGN PATENT DOCUMENTS 1667538  8/1971  Fed. Rep. of Germany .
 136259  6/1979  Fed. Rep. of Germany .......... 423/335
2805547  8/1979  Fed. Rep. of Germany .......... 423/338

*Primary Examiner*—Jack Cooper
*Attorney, Agent, or Firm*—Hammond & Littell, Weissenberger and Muserlian

[57] ABSTRACT

A process is herein described for the manufacture of high purity, granular silicic acid from aqueous alkali metal silicate solutions by acidification thereof, freezing and subsequently thawing the reaction mixture, and filtering, washing and drying the insoluble residue formed, in which the alkali metal silicate solutions have a molar ratio of $SiO_2:Me_2O$ of from about 2:1 to 20:1, Me representing an alkali metal, and before freezing the aqueous alkali metal silicate solutions are adjusted to a pH value in the range of from about 2.5 to 6 and to a $SiO_2$ content of from about 1 to 10 percent by weight by means of one or more aqueous solutions or suspensions of organic acids which complex aluminum, titanium, and iron ions and which form soluble alkali metal salts under the conditions of the process.

7 Claims, No Drawings

PROCESS FOR THE MANUFACTURE OF HIGH PURITY SILICIC ACID

This invention is directed to a process for the manufacture of high purity, granular silicic acid from aqueous alkali metal silicate solutions by acidification thereof, freezing and subsequently thawing the reaction mixture, and then filtering, washing and drying the insoluble residue formed. Due to its high degree of purity, the silicic acid thus obtained can be used as raw material for the manufacture of quartz glass.

FIELD OF THE INVENTION

This invention relates to a process for manufacturing silicic acid. More particularly, this invention relates to a process for manufacturing high purity silicic acid from aqueous alkali metal silicate solutions.

BACKGROUND OF THE INVENTION

Only raw materials having a very high degree of purity are generally suitable for the manufacture of quartz glass, since impurities in the starting material considerably impair the properties of the quartz glass produced. The raw material normally used is rock crystal comprising at least 99.7% of $SiO_2$ and imported chiefly from Brazil or Madagascar. By way of example, analysis of a Brazilian rock crystal showed the following composition:

| COMPONENT | PERCENT BY WEIGHT |
| --- | --- |
| $SiO_2$ | 99.750 |
| $Al_2O_3$ | 0.024 |
| $Fe_2O_3$ | 0.020 |
| $TiO_2$ | 0.002 |
| $CaO$ | 0.013 |

(C. Dohler, Sprechsaal fur Keramik, Glas, Email, Silikate, 99 (1966) 960-965)

The increasing demand for quartz glass, resulting from technological development, has made it necessary to seek other raw materials which can replace rock crystal and whose degree of purity is equal to, or even greater than, that of rock crystal. Rock crystal can be replaced by, for example, silicic acids which, as is known, can be obtained from water glass solutions. However, the commercially available water glasses have too high a level of impurities, which, hitherto, could only be eliminated by complex and/or expensive measures such as electrolysis, dialysis, electrodialysis, ion exchange, extraction processes, and the like.

A process for the manufacture of two-dimensional silicic acid from water glass solutions is described in German Auslegeschrift No. 12 68 122. According to this process, a dilute water glass solution is poured into a mineral acid, preferably sulphuric acid, until the pH value of the reaction mixture is adjusted to 4.4 to 4.8. The reaction mixture is subsequently frozen and then thawed, and the insoluble silicic acid formed is separated from the solution, washed, and dried.

In the aforementioned Auslegeschrift, the silicic acid obtained by this process is designated as "pure". However, this silicic acid has the disadvantage that it still contains large quantities of impurities in the form of aluminum, iron, and titanium ions which cannot be removed merely by washing (see Table 1 below). Moreover, when this process is used, it is necessary to comply with a relatively narrow pH range and to use highly dilute water glass solutions. Due to the above-mentioned impurities, a silicic acid obtained in this manner does not appear to be very suitable as a substitute for rock crystal for the purpose of manufacturing quartz glass.

OBJECTS OF THE INVENTION

It is an object of this invention to provide a process for the manufacture of silicic acid.

It is also an object of this invention to provide a process for the manufacture of high purity silicic acid from aqueous alkali metal silicate solutions.

It is further an object of this invention to develop a process for the manufacture, from water glass solutions, of high purity silicic acid whose content of aluminum, iron, and titanium ions is comparable to that of rock crystal or whose purity exceeds that of rock crystal.

These and other objects of the invention will become more apparent in the discussion below.

DESCRIPTION OF THE INVENTION

According to the process of this invention high purity, granular silicic acid is manufactured from aqueous alkali metal silicate solutions by acidification thereof, freezing, subsequent thawing of the frozen reaction mixture, and filtering, washing, and drying of the insoluble residue formed. The process is characterized in that, before freezing, or freezing-out, concentrated or dilute alkali metal silicate solutions having a molar ratio of $SiO_2:Me_2O$ of about 2:1 to 20:1, Me representing an alkali metal, are adjusted to a pH value in the range of from about 2.5 to 6 and to a content of about 1 to 10 percent by weight of $SiO_2$ by means of at least one water-dissolved or water-suspended organic acid which complexes aluminum, iron, and titanium ions, with the exception of those acids which do not form soluble alkali metal salts under the conditions of the process.

Thus, it has been found that the use of organic acids which complex aluminum, iron, and titanium ions provides, under the stated conditions of the process, a high purity, granular silicic acid whose degree of purity is thoroughly comparable with, or exceeds, that of rock crystal. (See Table 1 below.) Furthermore, the granular structure of the silicic acid manufactured in accordance with the invention facilitates the process itself with respect to separation of the mother liquor by filtration and the washing-out of soluble salts.

Dilute as well as concentrated alkali metal silicate solutions, that is, water glass solutions, having a molar ratio of $SiO_2:Me_2O$ in the range of from about 2:1 to 20:1 can be used in accordance with the process of this invention. Preferably, sodium or potassium is the alkali metal Me. Water glasses having a molar ratio of $SiO_2:Me_2O$ of greater than 4 require a stabilizing additive in the form of, for example, a water-soluble mono- and/or polyquaternary nitrogen compound having on the quaternary nitrogen atom at least one alkyl group free from hydroxyl groups. Stabilizing agents of this kind for stable, lower alkali content water glass solutions are described in, for example, German Offenlegungsschrift No. 16 67 538, incorporated herein by reference.

In accordance with the invention, preferably alkali metal silicate solutions having a molar ratio of $SiO_2:Me_2O$ in the range of from about 3.5 to 4:1 are employed. This range of molar ratios includes the commercially available water glass solutions having the lowest alkali content. Also, if desired or required, alkali metal silicate solutions having such molar ratios can be used in undiluted form.

Advantageously, the alkali metal silicate solution is allowed to flow slowly under continuous agitation into the acid, the acid being dissolved or suspended in water. The two components can be mixed without disadvantage at room temperature. In view of the subsequent freezing of the reaction mixture, higher temperatures are generally not advantageous.

Due to the desired high degree of purity of the final product, it is decidedly advantageous to exclusively use distilled or deionized water for diluting the water glass solution and/or for dissolving or suspending the acid. In any event, the total quantity of water used for this purpose must be such that the resultant reaction mixture has a total content of $SiO_2$ in the range of from about 1 to 10 percent by weight. In this manner, premature, undesirable formation of silica gels in the reaction mixture can be prevented. By way of example, commercially available alkali metal silicate solutions having a solids content of less than 35 percent by weight can also be used undiluted. In this case, the corresponding quantity of water, required to adjust the $SiO_2$ content of the reaction mixture, can serve exclusively to dissolve or suspend the acid.

Preferably, the $SiO_2$ content of the reaction mixture is adjusted to about 5 to 7 percent by weight, since the content of impurities in the final product generally increases with an increase in the concentration of $SiO_2$ in the reaction mixture. On the other hand, smaller $SiO_2$ concentrations in the reaction mixture require larger quantities of fluid, which in turn results in an increase in cost.

Adjustment of the pH value in the reaction mixture to the range of about 2.5 to 6 is effected simultaneously with the pouring of the alkali metal silicate solution into the acid. Advantageously, the change in the pH value is monitored by means of a suitable pH meter.

In the interest of obtaining the highest possible degree of purity and an optimum grain size of the silicic acid formed, it is advantageous to adjust the reaction mixture to pH values in the range of from about 3 to 5.

In the process of the invention, only those organic acids which are capable of complexly binding aluminum, iron, and titanium ions are suitable for acidifying the alkali metal silicate solution. Water-soluble as well as insoluble acids can be used for this purpose. However, it is of considerable importance that these acids, whether soluble or insoluble, should be capable, under the process conditions stated, of forming soluble alkali metal salts which can be removed from the silicic acid by washing out. Insoluble alkali metal salts are occluded by the silicic acid during subsequent freezing-out and thus remain as impurities in the final product.

Advantageously, a suitable acid is chosen by performing the process of the present invention with the particular acid and analyzing the silicic acid thus obtained with respect to its content of aluminum, iron, and titanium ions. By way of example, such an analysis can be performed by photometric determination of the said ions after evaporating the silicic acid with hydrofluoric acid. By way of example, organic acids suitable for performing the process in accordance with the invention, can be chosen from the group of the aminopolycarboxylic acids, polycarboxylic acids, also including polymers and copolymers containing carboxyl groups, polycarboxylic acids containing ether groups, and phosphonic acids. Acids of this kind can contain substituents in addition to carboxyl groups, such as hydroxyl groups, amino groups, or alkoxy groups, or, if desired, further substituents.

Among the above-mentioned organic acids, the phosphonic acids are particularly suitable for performing the process in accordance with the invention. Especially suitable phosphonic acids are those which contain at least one hydroxyl and/or amino group, such as phosphonic acids selected from the group consisting of:

(i) diphosphonic acids having the formula:

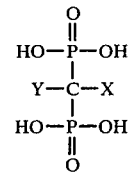

wherein X is a member selected from the group consisting of hydroxy and amino, and Y is a member selected from the group consisting of alkane having from 1 to 5 carbon atoms, aminoalkane having from 2 to 5 carbon atoms, hydroxyalkane having from 2 to 5 carbon atoms, phenyl, hydroxyphenyl, aminophenyl and halophenyl;

(ii) aminotri-(lower alkylene phosphonic acid); and (iii) ethylenediaminetetra-(lower alkylene) phosphonic acids. Preferred phosphonic acids include 1-hydroxyethane-1,1-diphosphonic acid, aminotrimethylene phosphonic acid or ethylenediaminetetramethylene phosphonic acid. Preferably, 1-hydroxyethane-1,1-diphosphonic acid is used for the process in accordance with the invention since excellent results can be obtained with respect to the degree of purity of the silicic acid obtained.

After adjustment of the desired pH value and $SiO_2$ content, the reaction mixture obtained is frozen by means of a suitable refrigerator or refrigeration means. By way of example, freezing can be effected batchwise in the form of blocks or, alternatively, continuously in the form of thin films. The duration of and the temperatures to be used for freezing depend upon the dimensions of the vessel used for freezing and upon the volume of the reaction mixture to be frozen. It is important, however, that the entire fluid reaction mixture should be converted to a solid body, that is to say, it should be frozen completely through.

The solid body obtained is subsequently thawed, using elevated temperatures if desired or required. The granular silicic acid formed can be readily separated from the mother liquor by means of suitable filtering devices. Advantageously, the insoluble residue obtained is washed several times with a dilute, aqueous solution of the same organic acid used in the first stage, if water-soluble, and is subsequently washed out several times with distilled or deionized water. The high purity silicic acid obtained is dried - at an elevated temperature if required.

Due to its high degree of purity, the silicic acid manufactured in accordance with the invention can be used as a starting material for the manufacture of quartz glass. Furthermore, a high purity silicic acid of this kind is particularly suitable for all applications in which special demands are made on the purity of silicic acid, such as in the manufacture of special glasses, as catalyst carriers, as auxiliary agents in the foodstuffs industry and as an additive to pharmaceutical and cosmetic products.

The process of the present invention is further illustrated by the following non-limitative examples:

EXAMPLE 1

An amount of 38.2 g of a 60% aqueous solution of 1-hydroxyethane-1,1-diphosphonic acid was diluted with 361.8 g of deionized water. One hundred and twenty-four grams of a commercially available sodium silicate (molar ratio $SiO_2:Na_2O=3.97$; total solids content 28.1%) were slowly added to this solution under constant agitation. The resultant reaction mixture had a $SiO_2$ content of 5.28% and a pH value of 4.7.

This reaction mixture was stored in a sealable one liter plastic vessel in a freezing cabinet for 24 hours at a temperature of $-20°$ C. The completely frozen mixture was subsequently thawed in a hot water bath (60° C.), and the solid sediment remaining was separated by means of suction filtration. The insoluble residue was washed five times with 150 ml of a 0.5% aqueous solution of 1-hydroxyethane-1,1-diphosphonic acid, in each case, and then three times with 150 ml of deionized water, in each case. A residue of 29.6 g of high purity, granular silicic acid remained after drying at 104° C.

EXAMPLE 2

Fifty-two grams of a 50% aqueous solution of aminotrimethylene phosphonic acid were diluted with 48 g of deionized water. An amount of 126.4 g of sodium silicate (as described in Example 1) diluted with 306 g of deionized water was slowly added to the first solution under agitation. The resultant reaction mixture had a $SiO_2$ content of 5.29% and a pH value of 4.5. This reaction mixture was stored for 24 hours in a shallow dish at $-5°$ C. The completely frozen mixture was worked up in a manner set forth in Example 1. The yield of silicic acid was 29.8 g.

EXAMPLE 3

An amount of 32.6 g of ethylenediaminetetramethylene phosphonic acid was suspended in 67.4 g of distilled water. A solution of 125 g of sodium silicate (as described in Example 1) in 300 g of deionized water was slowly added to the suspension under agitation. The resultant reaction mixture had a $SiO_2$ content of 5.31% and a pH value of 4.42. The mixture was further worked up in the manner set forth in Example 1 with the exception that the residue was washed with [a 0.5% aqueous solution of 1-hydroxy-ethane-1,1-diphosphonic acid]. The yield of silicic acid was 28.4 g.

EXAMPLE 4

An amount of 63.2 g of ethylenediaminetetramethylene phosphonic acid was suspended in 136.8 g of deionized water. A solution of 187.06 g of sodium silicate (as described in Example 1) in 396.44 g of deionized water was slowly added to the suspension under agitation. The resultant reaction mixture had a $SiO_2$ content of 5.31% and a pH value of 3.06. The mixture was further worked up in the manner set forth in Example 1 with the exception that the residue was washed with [a 0.5% aqueous solution of 1-hydroxy-ethane-1,1-diphosphonic acid]. The yield of silicic acid was 40 g.

EXAMPLE 5

An amount of 94.8 g of ethylenediaminetetramethylene phosphonic acid was suspended in 1296 g of deionized water. A solution of 375 g of sodium silicate (as described in Example 1) in 600 g of deionized water was added slowly to the suspension under agitation. The resultant reaction mixture had a $SiO_2$ content of 1% and a pH value of 4.39. Freezing, i.e., freezing out, was effected at $-20°$ C. for 56 hours in a 12 liter plastic vessel. The mixture was further worked up in the manner set forth in Example 1 with the exception that the residue was washed with [a 0.5% aqueous solution of 1-hydroxy-ethane-1,1-diphosphonic acid]. The yield of silicic acid was 79.1 g.

The table set forth below shows the results of the analysis with respect to the content of aluminum, iron, and titanium ions of the silicic acids obtained in accordance with Examples 1 to 5. The table also shows the corresponding results of analytical analysis of the sodium silicate (water glass) used as starting material, of a silicic acid obtained in accordance with Example 2 of German Auslegeschrift No. 12 68 122 (comparison example), and of a Brazilian rock crystal sample.

TABLE 1

| SAMPLE | ANALYSIS RESULTS | | |
|---|---|---|---|
| | Al(ppm) | Fe(ppm) | Ti(ppm) |
| Example 1 | 13 | 54 | <1 |
| Example 2 | 39 | 55 | <1 |
| Example 3 | 45 | 60 | <1 |
| Example 4 | 11 | 50 | <1 |
| Example 5 | 35 | 53 | <1 |
| Rock crystal | 127 | 140 | 12 |
| Comparison example | 100 | 274 | 200 |
| Sodium silicate | 582 | 294 | 207 |

As can be seen from the table, the silicic acids obtained according to this invention were substantially more free from impurities than were the Brazilian rock crystal, the comparison example, or the sodium silicate used as starting material.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In a process for the manufacture of high purity, granular silicic acid from an aqueous alkali metal silicate solution comprising acidification of the aqueous alkali metal silicate solution, freezing of the acidified solution, thawing of the frozen acidified solution, and then filtration, washing, and drying of the insoluble precipitate formed, the improvement which comprises using an alkali metal silicate solution having a molar ratio of $SiO_2:Me_2O$ of from about 2:1 to 20:1, Me representing an alkali metal, and, before freezing, adjusting the alkali metal silicate solution to a pH value in the range of from about 2.5 to 6 and to a $SiO_2$ content of from about 1 to 10 percent by weight by the addition of aqueous solutions or suspensions of one or more phosphonic acids having at least one hydroxyl and/or amino group selected from the group consisting of:

(i) diphosphonic acids having the formula:

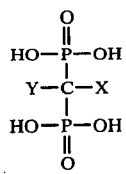

wherein X is a member selected from the group consisting of hydroxy and amino, and Y is a member selected from the group consisting of alkane having from 1 to 5 carbon atoms, aminoalkane having from 2 to 5 carbon atoms, hydroxyalkane having from 2 to 5 carbon atoms, phenyl, hydroxyphenyl, aminophenyl and halophenyl;

(ii) aminotri-(lower alkylene phosphonic acid); and (iii) ethylenediaminetetra-(lower alkylene) phosphonic acids.

2. The process of claim 13, in which the alkali metal silicate solutions have a molar ratio of $SiO_2:Me_2O$ of from about 3.5:1 to 4:1.

3. The process of claim 13, in which the alkali metal silicate solutions are adjusted to a pH value in the range of from about 3 to 5.

4. The process of claim 13, in which the alkali metal silicate solution is adjusted to a content of from about 5 to 7 percent by weight of $SiO_2$.

5. The process of claim 1, in which the phosphonic acid is 1-hydroxyethane-1,1-diphosphonic acid.

6. The process of claim 1, in which the phosphonic acid is aminotrimethylene phosphonic acid.

7. The process of claim 1, in which the phosphonic acid is ethylenediaminetetramethylene phosphonic acid.

* * * * *

UNITED STATES PATENT AND TRADEMARK OFFICE
CERTIFICATE OF CORRECTION

PATENT NO. : 4,264,564
DATED : April 28, 1981
INVENTOR(S) : Wolfgang Friedemann et al.

It is certified that error appears in the above—identified patent and that said Letters Patent is hereby corrected as shown below:

Preamble page under "[75]": "Helmut V. Freyhold" should read

-- Helmut v. Freyhold -- .

Claims 2,3,4, line 1 of each: "13" should read -- 1 --.

Signed and Sealed this

Eighth Day of September 1981

[SEAL]

Attest:

GERALD J. MOSSINGHOFF

Attesting Officer

Commissioner of Patents and Trademarks